United States Patent [19]
Cayol et al.

[11] 3,816,248
[45] June 11, 1974

[54] NUCLEAR FUEL PIN
[75] Inventors: André Cayol, Aix-en-Provence;
Georges Clottes, Manosque;
Jean-Louis Ratier, Aix-en-Provence,
all of France
[73] Assignee: Commissariat A L'Energie
Atomique, Paris, France
[22] Filed: June 16, 1971
[21] Appl. No.: 153,648

[30] Foreign Application Priority Data
June 19, 1970 France .............................. 70.22835

[52] U.S. Cl. ....................... 176/81, 176/76, 176/79
[51] Int. Cl. ....... G21c 3/06, G21c 3/04, G21c 3/28
[58] Field of Search ............. 176/68, 73, 76, 79, 81, 176/40

[56] References Cited
UNITED STATES PATENTS
3,022,240  2/1962  Bassett .............................. 176/68
3,140,983  7/1964  Waire ................................. 176/73
3,215,606  11/1965  Silvester ........................... 176/68 X
3,238,108  3/1966  Dedders et al .................... 176/73 X
3,274,066  9/1966  Zumwalt ............................ 176/68
3,274,067  9/1966  Grechler et al ................... 176/73 X
3,310,474  3/1967  Saunders ........................... 176/73 X Primary Examiner—Carl D. Quarforth
Assistant Examiner—Roger S. Gaither

[57] ABSTRACT

A nuclear fuel pin for a fast reactor comprising a can closed by end-plugs and containing a column of pellets of fissile material, the fuel pin being fitted with a spacer wire which is helically wound on the can and the extremities of which are attached to the end-plugs. The diameter of the can section which contains the fissile material is substantially constant along its entire length and slightly smaller than the diameter of the terminal portions which carry the end-plugs, the length of each terminal portion being at least equal to one-half the winding pitch of the spacer wire.

4 Claims, 2 Drawing Figures

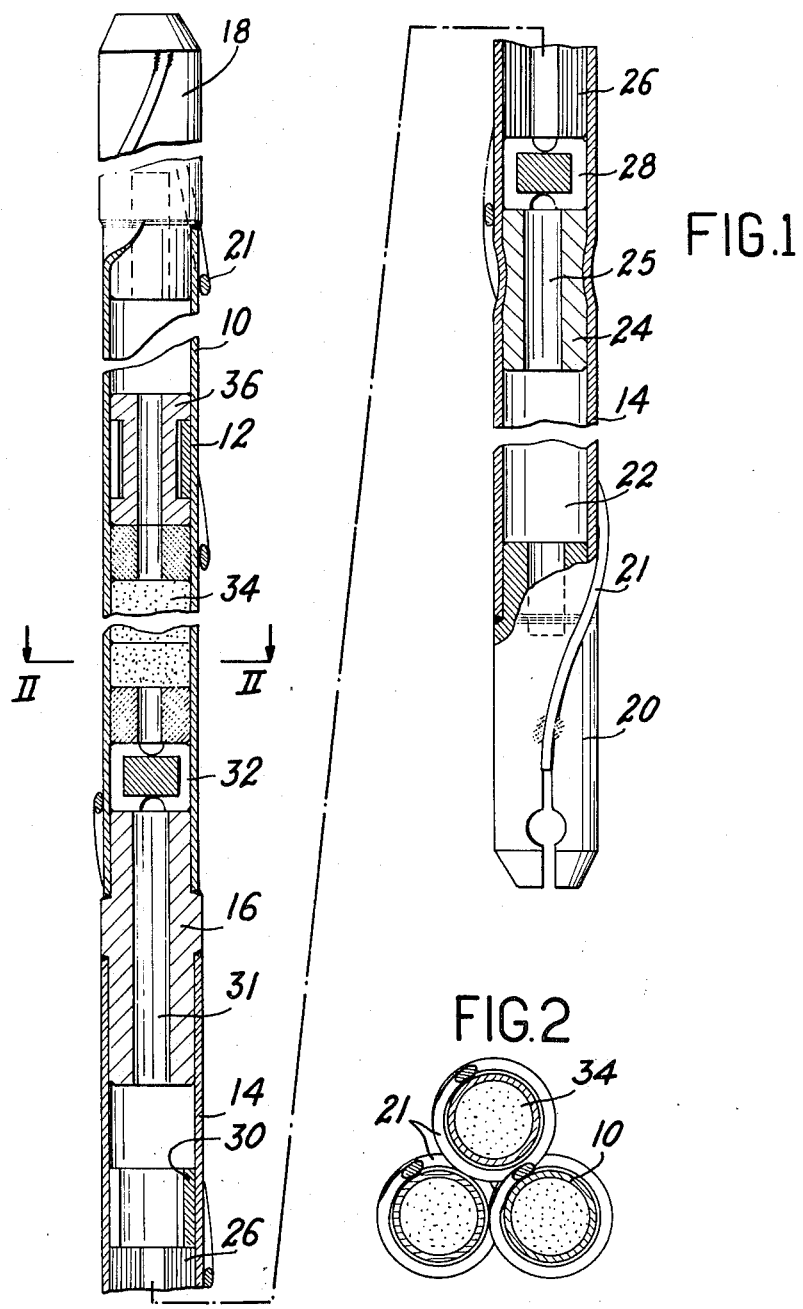

NUCLEAR FUEL PIN

This invention relates to nuclear fuel pins of the type comprising a leak-tight can closed by end-plugs and containing a column of stacked pellets of fissile material and at least one column of stacked pellets of fertile material. Fuel pins of this type are employed in nuclear reactors of the fast neutron type which are cooled by a circulation of liquid alkali metal: the columns of fissile material (uranium dioxide and/or plutonium, for example) are in juxtaposed relation so as to constitute the reactor core whilst the columns of fertile material constitute the axial blanket. The fuel pins are grouped together in bundles or clusters in separate assemblies in which said pins are supported on the one hand by a support grid and on the other hand by spacers which are carried by the pins (and usually consist in each case of a helically wound wire).

It may reasonably be concluded from the most recent observations that, in a fast reactor having a high power rating (250 to 1,000 MWe), stainless steel swells under the action of the integrated neutron flux in the zone in which this latter has the highest value, that is to say within the reactor core. Furthermore, these observations appear to confirm that the fuel pins swell to a greater extent than the hexagonal sleeve of the fuel assembly, at least in certain cases. As has been stated above, swelling takes place only at the level of the fissile material and not at the level of the fertile blankets and/or of the shielding in which the flux is of lower value. This swelling process is liable to result in deformations which may have serious consequences.

The primary aim of the invention is to provide a solution to this problem. With this objective, the invention proposes a nuclear fuel pin for a fast reactor comprising a can closed by end-plugs and containing a column of pellets of fissile material, said fuel pin being fitted with a spacer which is helically wound on the can so as to project to a constant distance therefrom and the extremities of which are attached to the end-plugs, the fuel pin being distinguished by the fact that the diameter of the section which contains the fissible material is slightly smaller than the diameter of the terminal portions which carry the end-plugs, the length of each terminal portion being at least equal to one-half the winding pitch of the spacer.

In a particular mode of application of the invention, the fuel pin contains not only a column of fissile material but also a column of pellets of fertile material: in this case, the can section containing the fertile material is designed to have a diameter which is larger than that of the can section containing the fissible material and said fertile section constitutes with its end-plug one of the terminal portions of the can. The corresponding end-plug can in that case be much shorter than the other end-plug whose length must be sufficient to provide a bearing surface over one half-pitch.

By virtue of these arrangements, the can section which contains the fissile material is permitted to swell to a slight extent as the neutron radiation takes place since the spacing between adjacent fuel pins is governed by the diameter of the terminal portions. The maximum value of said swelling is established by the clearance between pins at the level of the fissile material; said clearance in turn depends directly on the difference between the diameter of this portion and the diameter of the terminal portions (a few tenths of a millimeter in respect of a diameter of approximately 6.5 mm).

It is readily apparent that the invention also applies both to the case of a can which contains two columns of fertile material each located on one side of the column of fuel material and to the case of a can which contains either fissile material alone or only one fertile column. The oxide fuel pins which are designed for high radiation rates must be provided with a fission-gas collection space except of course in the event that said pins are provided with vents. In the case of a reactor of the upward coolant flow type, said collection space will be placed at the lower end of the fuel pin. The portion which delimits said collection space will advantageously have a diameter equal to that of the can section which contains the column (or columns) of fertile material.

A better understanding of the invention will be obtained from the following description of a fuel pin constituting a particular embodiment which is given by way of example but not by way of limitation, reference being made to the accompanying drawings, wherein:

FIG. 1 is a diagrammatic sectional view of the fuel pin;

FIG. 2 is a diagrammatic sectional view taken along line II—II of FIG. 1 and showing the relative arrangement of the fuel pin of FIG. 1 and of two adjacent fuel pins.

The fuel pin which is illustrated in FIG. 1 and intended to be employed in a fast reactor which is cooled by an upward circulation of liquid sodium comprises a leak-tight can 10 formed of two tubular sections 12 and 14 which are connected together by means of an intermediate plug 16 and closed by a top plug 18 and a bottom plug 20. A spacer wire 21 is wound in a helix having a long pitch and the extremities of the wire are attached to the end-plugs. Said wire has a constant diameter and is in intimate contact with the can along the entire length of this latter.

There is shown within the can, starting from the bottom plug 20, a fission-gas collection space 22 which is delimited by said plug 20 and by a distance-piece 24 which is forcibly fitted in the tubular section 14 and pierced by an axial passageway 25 for the admission of fission gases. A column 26 of stacked pellets of fertile material (natural or depleted uranium dioxide, for example) is supported on the distance-piece 24 by means of a bearing plug 28 which can be of the type described in U.S. Pat. application Ser. No. 142,315 assigned to the assignee of the present invention and corresponding to French application No. EN 7018869. A retaining member 30 serves to maintain the column 26 applied against the baffle component 28 and separates said column from a space for the expansion of the fertile material, said space being delimited by the intermediate plug 16 in which is pierced a passageway 31 for the fission gases.

A column 34 of pellets of fuel material (sintered pellets of uranium dioxide and/or plutonium dioxide, for example) is supported on the intermediate plug 16 by means of a baffle component 32 which can be identical with the component 28. The column 34 is also retained by a supporting member 36.

The bottom section 14 of the fuel pin according to the invention which contains the column 26 of fertile material and delimits the fission-gas collection space 22 has an external diameter which is equal to that of the end-plugs 20 and 18. On the other hand, the tubular section 12 which contains the column 34 of pellets of fissile material has a slightly smaller external diameter. The spacer wire 21 is wound on the can in close contact with this latter along the entire length of the fuel pin.

As shown in FIG. 1, the intermediate plug 16 which provides a connection between the cans has a central portion which is equal in diameter to the tubular section 14 containing the fertile material and has two terminal portions of different diameter. The lower terminal portion is inserted with slight friction in the tubular section 14, said section being joined to the intermediate plug 16 by welding in the zone of contact between the tubular section 14 and the central portion. The other terminal portion of the intermediate plug 16 is smaller in diameter than the first and corresponds to the internal diameter of the tubular section 12 so as to engage within this latter, joining being again effected by welding in the zone of contact between the tubular section 12 and the central portion.

Under these conditions, spacing between the adjacent fuel pins of the same fuel cluster is determined by the portions of the spacer wire 21 which are carried by the plugs 18, 16 and 20 and by the tubular section 14. Clearances are consequently permitted to remain at the level of the columns 34 of fissile material and may be taken up at the time of swelling of the fuel but have no incidence on the positional maintenance of the fuel pins in the cluster.

It can be noted by way of example that a fuel pin for a fast reactor which is cooled by a circulation of liquid sodium has been provided with a lower section 14 and an upper section having diameters which differ by approximately two-tenths mm.

The fuel pin which is illustrated by way of example in FIG. 1 comprises a single column of fertile material. However, it can readily be understood that the invention will also be applicable to a fuel pin consisting of two columns of fertile material each located on one side of the column of fissile material or to the case of a fuel pin made up of fertile material located on one side of the fissile material and a plug of sufficient length which is located on the other side. In the first case, it is also apparent that each fuel pin bears on the adjacent pins over a particularly substantial fraction of the length and that this is a favorable factor.

We claim:

1. A nuclear fuel pin for a fast reactor comprising an elongated generally open ended tube shaped can having open end portions, said can having at least one large diameter section and at least one small diameter section, end plugs sealingly closing the open end portions of said can, a spacer wire helically wound on the can with end portions of the wire attached to the end plugs, a column of pellets of fertile material positioned within the large diameter section of the can, a column of pellets of fissile material positioned within the small diameter section of said can, the small diameter section of the can containing the fissile material being of a substantially constant diameter along its entire length and of a slightly smaller diameter than the large diameter section of the can, the diameter of the end plugs being substantially identical with that of the large diameter section of the can, the length of each of the end portions of said can being at least equal to one-half of a winding pitch of the spacer wire on said can, whereby the small diameter section of the can containing the fissile material being smaller than that containing the fertile material compensates for a greater and increased expansion of the fissile material.

2. A fuel pin according to claim 1, having a fission-gas collecting chamber within the large-diameter section of the can containing fertile material.

3. A fuel pin according to claim 1 for use in vertical condition for a reactor having an upward coolant flow, wherein the can section containing the fertile material is adjacent the bottom of the can and includes a fission-gas collection space and a spacer rigidly fixed to the can, the column of pellets of fertile material being supported on said spacer.

4. A fuel pin according to claim 1, having an intermediate plug formed with passageway for the fission gases secured to the can between the sections which contain the fertile material and the fissile material, respectively.

* * * * *